March 4, 1924.

E. S. WARD

ANIMAL TRAP

Filed April 17, 1922    2 Sheets-Sheet 1

E. S. Ward,
Inventor

March 4, 1924.

E. S. WARD

ANIMAL TRAP

Filed April 17, 1922    2 Sheets-Sheet 2

1,485,746

E. S. Ward,
Inventor

By ⟨signature⟩
Attorney

Patented Mar. 4, 1924.

1,485,746

UNITED STATES PATENT OFFICE.

EDWARD S. WARD, OF SAN JOSE, CALIFORNIA.

ANIMAL TRAP.

Application filed April 17, 1922. Serial No. 553,397.

*To all whom it may concern:*

Be it known that I, EDWARD S. WARD, a citizen of the United States, residing at San Jose, in the county of Santa Clara and State of California, have invented a new and useful Animal Trap, of which the following is a specification.

This invention relates to traps and more particularly to a trap especially designed for trapping rats, mice or the like.

The primary object of the invention is to provide a trap having means to catch the rodent from the back instead of catching the animal as it crawls into the trap.

Another object of the invention is to provide a trap wherein the moving parts thereof will be protected from dirt and sand falling thereonto, to defeat the purpose of the invention.

With the foregoing and other objects in view which will appear as the description proceeds, the invention resides in the combination and arangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1:
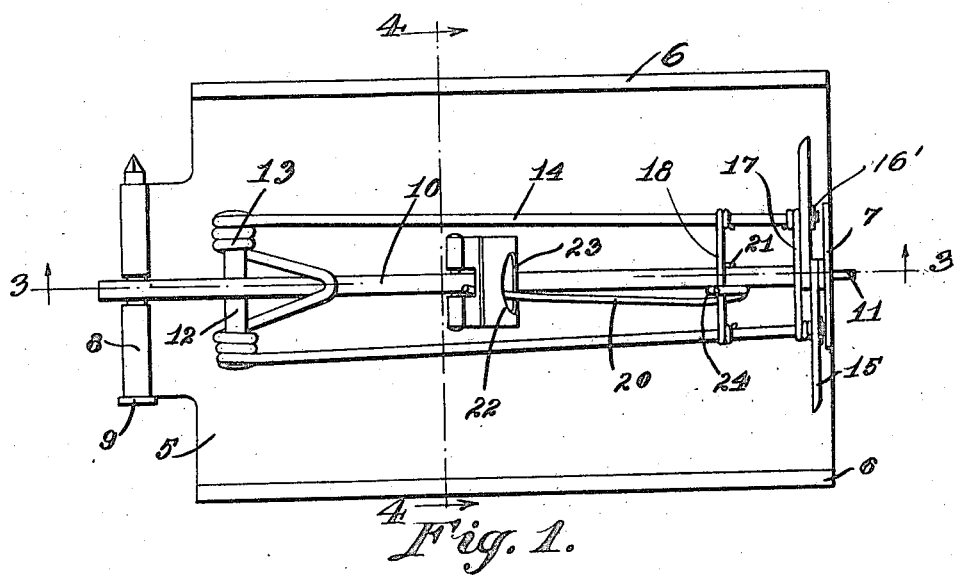
Figure 1 is a bottom plan view of a trap constructed in accordance with the invention.
Figure 2:
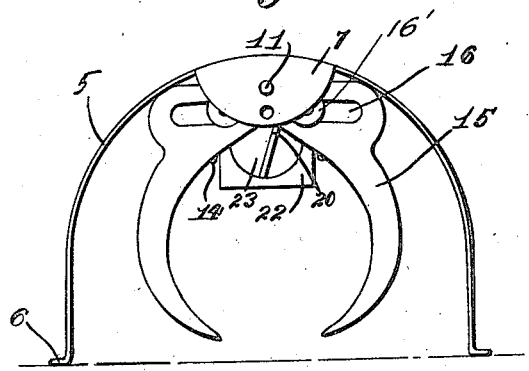
Figure 2 is an end elevational view disclosing the jaws as in a set position.
Figure 3:
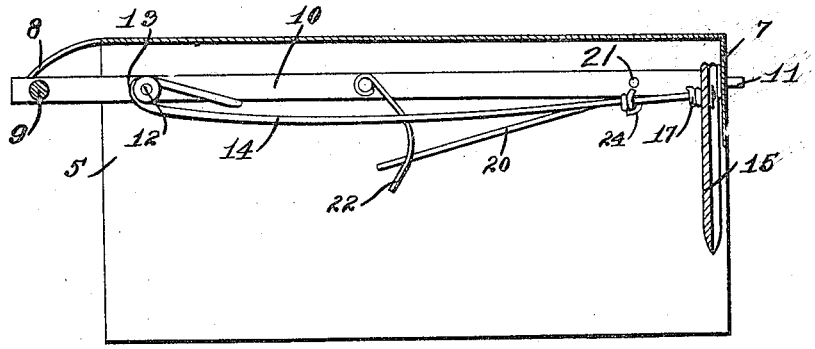
Figure 3 is a sectional view taken on line 3—3 of Figure 1.
Figure 4:
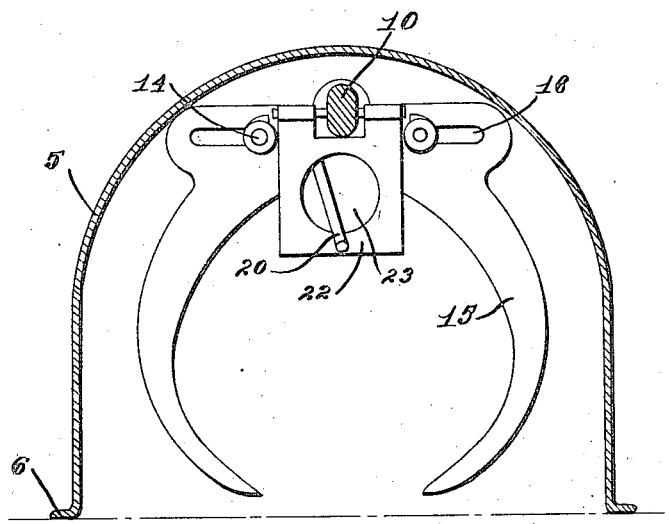
Figure 4 is a sectional view taken on line 4—4 of Figure 1.

Referring to the drawings in detail, the body portion of the trap is indicated at 5 and as shown, is curved to form a cover for the moving parts of the trap to protect the same against dirt or sand.

The lower side edges of the body portion 5 extend laterally and provides supports or rests for the body portion, the rests being indicated at 6. Extensions 7 and 8 respectively are formed integral with the body portion 5 and are disposed at opposite ends thereof, the extension 7 being bent at right angles to provide a support for the mechanism of the trap to be hereinafter more fully described. The extension 8 is bent inwardly to provide bearings for the bolt 9 which secures the supporting bar of the trap to the body portion as clearly shown by Figure 1 of the drawings.

This supporting bar is indicated at 10 and is formed with an opening adjacent to one end thereof, to accommodate the bolt 9. Formed at the opposite end of the supporting bar 10 is a pin 11 positioned in a suitable opening formed in the extension 7. From the foregoing it will be obvious that due to this construction, the bolt 9 may be readily and easily removed, allowing the bar 10 together with the jaws 15 supported thereby, to be disconnected from the body portion 5 and permit the animal caught in the trap to be easily removed therefrom. A pin 12 extends through the supporting bar and provides a support for the coiled portions 13 of the spring arm 14, a portion of the spring arm straddling the bar 10 as shown by Figure 1 of the drawings. Thus it will be seen that when the outer ends of the arms 14 are moved towards the bar 10, the arms are placed under tension.

Mounted at one end of the bar 10 are the curved fingers or jaws 15 which are formed with elongated openings 16 adapted to receive the free ends of the arms 14, which arms are supplied with washers 16' that engage the outer surfaces of the jaws 15 for securing the arms within the openings in a manner to allow of free movement between the arms 14 and jaws.

Connecting the arms 14 at a point adjacent the free ends thereof, is a connecting wire 17 while disposed adjacent to the wire 17 is a wire 18, which cooperates with the pivoted arm 20 for securing the arms 14 in their active positions to hold the jaws open.

The numeral 21 designates a pin that extends through the bar 10 and on which is pivotally supported the arm 20, which arm extends to the rear of the trap and cooperates with the latch member 22 for holding the arms 14 in their open positions. This latch member 22 has pivotal connection with the bar 10 at a point intermediate the ends thereof, there being provided an opening 23 in the latch member for the reception of the free end of the pivoted arm 20. Thus it will be seen that since the latch member 23 extends downwardly and lies in the path of travel of a rodent passing into the trap, the rodent will by contact with the latch member 21, move the same to release the arm 20.

As shown, a hook member 24 forms a part of the arm 20 and engages over the wire 18 to hold the arms against movement, when the trap is in its set position. Thus it will be seen that upon movement of the arm 20 as previously described, the hook member 24 will be released to the end that the jaws will move into gripping relation with each other to grip the rodent passing into the trap.

It might be further stated however that any suitable bait may be employed in the trap to entice a rodent to enter the trap.

Having thus described the invention, what is claimed as new is:—

In a trap, a curved body portion having its lower edges extended at right angles to provide supports for the body portion, a depending extension formed at each end of the body portion, a pivot bolt supported by one of the extensions, a supporting bar having an opening to receive the bolt, one end of the bar having a pin, the opposite depending extension having an opening to receive the pin, a pair of pivoted jaws mounted at one end of the bar, and means controlled by an animal passing through the trap for actuating the jaws to grip the animal.

In testimony that I claim the foregoing as my own, I have hereto affixed my signature in the presence of two witnesses.

EDWARD S. WARD.

Witnesses:
F. L. MURCH,
W. H. FINCH.